US012600869B2

(12) United States Patent
Ma et al.

(10) Patent No.: US 12,600,869 B2
(45) Date of Patent: Apr. 14, 2026

(54) INTUMESCENT COATING COMPOSITION

(71) Applicant: PPG Industries Ohio, Inc., Cleveland, OH (US)

(72) Inventors: Shuang Ma, Nieuw-Vennep (NL); Ronnie Peskens, Haarlem (NL); Christophe Grenier, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 856 days.

(21) Appl. No.: 17/442,693

(22) PCT Filed: Mar. 26, 2020

(86) PCT No.: PCT/US2020/024869
§ 371 (c)(1),
(2) Date: Sep. 24, 2021

(87) PCT Pub. No.: WO2020/198424
PCT Pub. Date: Oct. 1, 2020

(65) Prior Publication Data
US 2022/0145097 A1 May 12, 2022

Related U.S. Application Data

(60) Provisional application No. 62/823,691, filed on Mar. 26, 2019.

(51) Int. Cl.
| | |
|---|---|
| C09D 5/18 | (2006.01) |
| C08G 59/50 | (2006.01) |
| C08K 3/013 | (2018.01) |
| C08K 5/00 | (2006.01) |
| C08K 5/54 | (2006.01) |
| C08K 5/5425 | (2006.01) |
| C08K 5/5435 | (2006.01) |
| C08K 5/544 | (2006.01) |
| C08K 5/548 | (2006.01) |
| C09D 7/61 | (2018.01) |
| C09D 7/63 | (2018.01) |
| C09D 7/65 | (2018.01) |
| C09D 163/00 | (2006.01) |
| H01M 10/052 | (2010.01) |
| H01M 10/0525 | (2010.01) |
| H01M 50/121 | (2021.01) |
| H01M 50/124 | (2021.01) |
| H01M 50/143 | (2021.01) |
| H01M 50/24 | (2021.01) |

(52) U.S. Cl.
CPC .......... *C09D 5/185* (2013.01); *C08G 59/504* (2013.01); *C08K 3/013* (2018.01); *C08K 5/0025* (2013.01); *C08K 5/5425* (2013.01); *C08K 5/5435* (2013.01); *C08K 5/548* (2013.01); *C09D 7/61* (2018.01); *C09D 7/63* (2018.01); *C09D 7/65* (2018.01); *C09D*
*163/00* (2013.01); *H01M 10/052* (2013.01); *H01M 50/121* (2021.01); *H01M 50/124* (2021.01); *H01M 50/1245* (2021.01); *H01M 50/143* (2021.01); *H01M 50/24* (2021.01); *C08K 5/54* (2013.01); *C08K 5/544* (2013.01); *H01M 10/0525* (2013.01); *H01M 2220/20* (2013.01); *Y02E 60/10* (2013.01)

(58) Field of Classification Search
CPC ........ C09D 7/63; C09D 5/185; C09D 163/00; C09D 7/61; C09D 7/65; H01M 50/143; H01M 50/121; H01M 50/1245; H01M 10/0525; H01M 2220/20; H01M 50/24; C08G 59/504; C08K 3/013; C08K 5/0025; C08K 5/5425; C08K 5/5435; C08K 5/548; C08K 5/544; C08K 5/54; Y02E 60/10
See application file for complete search history.

(56) References Cited

U.S. PATENT DOCUMENTS

| | | | | |
|---|---|---|---|---|
| 5,139,857 A | * | 8/1992 | Herndon | ................ C09J 163/00 428/416 |
| 2003/0087189 A1 | * | 5/2003 | Takagi | ............. H01L 23/49894 430/311 |
| 2010/0055439 A1 | * | 3/2010 | Lee | ........................ C03C 25/103 428/375 |
| 2011/0311830 A1 | | 12/2011 | Wade | |
| 2016/0160059 A1 | * | 6/2016 | Anderson | ............ C09D 163/00 427/385.5 |
| 2017/0038686 A1 | * | 2/2017 | Liao | ........................ G03F 7/038 |

FOREIGN PATENT DOCUMENTS

| | | | |
|---|---|---|---|
| CA | 2950980 A1 | | 12/2015 |
| JP | 11-12440 | * | 1/1999 |
| RU | 2524600 C2 | | 12/2012 |
| WO | 2010054984 A1 | | 5/2010 |

(Continued)

OTHER PUBLICATIONS

Machine English translation of JP 1999-012440, Ota, Jan. 19, 1999.*

(Continued)

*Primary Examiner* — Patrick D Niland

(57) ABSTRACT

The present invention discloses an intumescent coating composition, a method for coating a substrate with said composition, a substrate coated with said composition, an article comprising said substrate, and a method to provide fire protection for a battery and/or an article comprising a battery in particular a vehicle comprising a lithium ion battery.

27 Claims, 2 Drawing Sheets

(56)  References Cited

FOREIGN PATENT DOCUMENTS

| WO | 2011084880 | A2 | 7/2011 |
| WO | 2011156345 | A1 | 12/2011 |
| WO | 2017106195 | A1 | 6/2017 |
| WO | 2019020506 | A1 | 1/2019 |

OTHER PUBLICATIONS

International Search Report and Written Opinion received for PCT Application Serial No. PCT/US2020/024869 dated Jul. 14, 2020, 8 pages.

* cited by examiner

INTUMESCENT COATING COMPOSITION

The present invention relates to an intumescent coating composition, to a method for coating a substrate with said composition, to a substrate coated with said composition, to an article comprising said substrate and to a method to provide fire protection for a battery and/or an article comprising a battery in particular a vehicle comprising a lithium ion battery.

BACKGROUND OF THE INVENTION

Commercial intumescent coating compositions generally contain considerably high amounts of $TiO_2$ as an important component to obtain the desired fire protection and mechanical characteristics of the cured coating in particular char strength with the result that the resultant cured coatings are generally white or off white and cannot be easily tinted. Since these intumescent compositions were generally used for fire protection in construction applications this was so far not considered as draw back.

Batteries have long been used as mobile power sources. In particular the development of lithium ion batteries has led to an increased power density. As a result, the use of lithium ion batteries has become wide spread in a variety of applications, including consumer electronics particularly mobile phones, tablet and laptop computers, medical devices, industrial equipment, and in particular hybrid/electrical vehicles.

However, many batteries and particularly lithium ion batteries are vulnerable to thermal runaways during which heat and gas are rapidly discharged from a battery and a fire hazard is created. Batteries, especially lithium ion batteries, may comprise electrolyte compositions that contain combustible organic solvents that add to the fire hazard associated with batteries, in particular lithium ion batteries. Furthermore, the batteries used in the above exemplified applications are predominantly battery packs comprising a plurality of individual battery cells. Lithium ion batteries for hybrid or electric vehicles like cars, busses and trucks may contain thousands of individual battery cells. A thermal runaway may be caused by manufacturing defects, accumulation of heat, internal short circuits, or external impacts or trauma. A thermal runaway in one battery cell may affect adjacent battery cells leading to an uncontrollable chain reaction with the result that the entire battery pack may catch fire which in case of vehicles comprising those batteries may spread over the entire vehicle putting the drivers and passengers at risk.

Recent incidents with cell phones or electric cars catching fire due to a thermal runaway of the battery pack make it evident that there is a need to provide better fire protection for batteries, battery cells as well as apparatuses comprising said batteries such as mobile phones, tablet or laptop computers and hybrid or electric vehicles and for their users. Therefore, intumescent coating compositions might be useful to provide fire protection for batteries and articles comprising batteries, particularly lithium ion batteries.

Compared to intumescent coating compositions hitherto used in construction applications in addition to provide fire protection additional requirements might be important for intumescent coating compositions that are useful in battery applications. Since these coating compositions are intended to be used to provide fire protection to consumer products like cell phones, tablet or laptop computers or cars there is a desire in the industry that the color of the coating is not limited to white or off white, i.e. that the intumescent coating compositions can be tinted to provide a wide range of appealing colors in particular black and can be formulated to provide the desired gloss in particular high gloss coatings without compromising the fire protections and mechanical properties of the cured intumescent coating.

Furthermore, the above discussed articles to be protected against battery fires are mobile articles and therefore might be subjected to mechanical shock or impact. Thus, there is a desire in industry for intumescent coating compositions that exhibit improved impact resistance of the cured coating.

In addition, the above-mentioned articles or battery cases for said articles can be made of aluminum or may comprise aluminum parts with the result that the intumescent coating compositions are intended to be applied onto aluminum substrates. Therefore, there is a further desire in industry for intumescent coating compositions that exhibit improved adhesion of the cured coating to aluminum substrates.

Thus, according to a general aspect it is an object of the present invention to provide an intumescent coating composition that meets one or more of the above discussed desires in industry.

SUMMARY OF THE INVENTION

This and other objects have been attained by an intumescent coating composition comprising:

(a) a resin component comprising (a1) a polyepoxy-functional compound and optionally;

(a2) a beta-hydroxy ester of (meth)acrylic acid; and/or (a3) a (meth)acrylate-functional compound different from compound (a2);

(b) a crosslinker component comprising at least one compound (b1) bearing a plurality of functional groups that are reactive with the epoxy groups of the polyepoxy-functional compound;

(c) 5 to 20 wt.-% based on the total weight of the intumescent coating composition of an organo silane compound selected from organo silane compounds of formula (I) or (ii) and combinations thereof $$(\text{Y-L-})_n\text{—SiX}_m\text{R}_o \tag{I},$$

$$(\text{Y-L})_u\text{-B—(K—SiX}_v\text{R}_w)_z \tag{II}$$

wherein:

n and m are integers from 1 to 3 and o is an integer from 0 to 2, wherein n+m+o is 4;

y is an integer from 1 to 3 and w is an integer from 0 to 2, wherein y+w is 3;

u is an integer of at least 1 and z is an integer of at least 2;

B is a polyvalent organic group, wherein the valency of B is u+z;

L is a divalent organic group or a bond if Y is a vinyl group;

K is a divalent organic group or a bond.

Y— is a functional group reactive with the epoxy groups and/or the (meth)acrylate groups if present of component (a) or the functional groups of component (b);

X is independently selected at each occurrence from chloro, alkoxy, acyloxy and oximino; and R is a hydrocarbyl group;

(d) a compound providing an expansion gas upon thermal decomposition; wherein the compounds as defined for (a) to (d) differ from each other, wherein the intumescent coating composition is liquid at 23° C. and atmospheric pressure and comprises less than 5 wt.-% based on the total weight of the composition of water.

The present invention further relates to a method for coating a substrate comprising applying the intumescent coating composition according to the present invention at least partially to a substrate and optionally curing the applied coating composition.

According to a further aspect, the present invention is directed to a substrate coated by said method and to an article comprising said substrate.

According to a still further aspect, the present invention is directed to the use of the intumescent coating composition according to the present invention to provide fire protection for a battery or a battery case and/or to reduce or prevent thermal runaway of a battery or a battery case when applied to any part of the battery or the battery case; or to provide fire protection for an article comprising a battery when applied to a part of the article adjacent to the battery between the battery and the article, wherein the battery is suitably a lithium ion battery.

According to a still further aspect, the present invention is directed to a method to provide fire protection to a battery or to reduce or prevent thermal runaway of a battery by applying the curable intumescent coating composition as defined according to the present invention to any part of the battery to form a coating thereon and curing the coating to obtain a crosslinked intumescent coating thereon.

According to a still further aspect, the present invention is directed to a method to provide fire protection for an article comprising a battery by applying the curable intumescent coating composition as defined according to the present invention to a part of the article adjacent to the battery between the battery and the article to form a coating thereon and curing the coating to obtain a crosslinked intumescent coating thereon. In particular the article may be a vehicle comprising a lithium ion battery and a passenger cabin and the crosslinked intumescent coating is positioned to protect the passenger cabin of the vehicle from a battery fire.

DETAILED DESCRIPTION OF THE INVENTION

Figure 1:
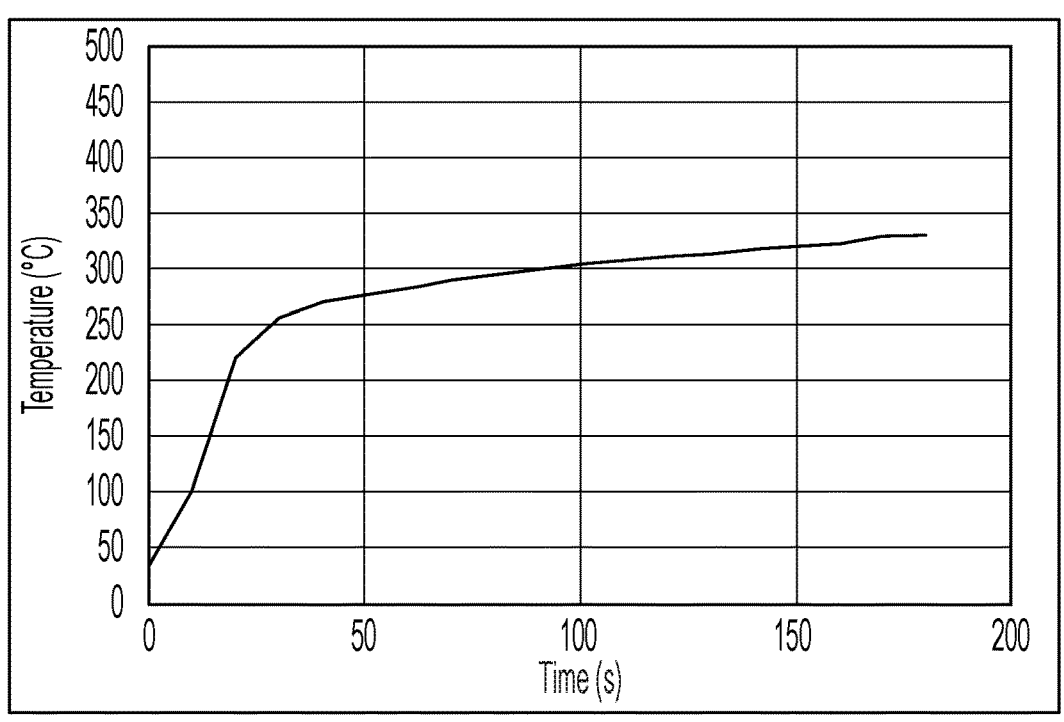
FIG. 1 is a graph showing the thermal transfer of heat through an exemplary intumescent coating of the present invention over time.

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent. For example, although reference is made to "a" polymer, "a" curing agent", "a" carbon source, "a" foaming agent, "an" acid source, "a" reinforced fiber, "an" inorganic additive, "a" coating composition and the like, one or more of any of these components can be used.

The term "hydrocarbyl" herein refers to a group comprising carbon and hydrogen atoms.

The term "long chain hydrocarbon substituent" herein refers to a hydrocarbyl having at least 6 carbon atoms.

The term "battery" as used herein throughout the claims and the specification refers to an individual battery cell as well to a battery pack comprising a plurality of battery cells.

According to a general aspect of the present invention the intumescent coating composition comprises:

(a) a resin component comprising (a1) a polyepoxy-functional compound and optionally;

(a2) a beta-hydroxy ester of (meth)acrylic acid; and/or (a3) a (meth)acrylate-functional compound different from compound (a2);

(b) a crosslinker component comprising at least one compound (b1) bearing a plurality of functional groups that are reactive with the epoxy groups of the polyepoxy-functional compound;

(c) 5 to 20 wt.-% based on the total weight of the intumescent coating composition of an organo silane compound selected from organo silane compounds of formula (I) or (ii) and combinations thereof $$(Y\text{-}L\text{-})_n\text{—}SiX_mR_o \qquad (I),$$

$$(Y\text{-}L)_u\text{-}B\text{-}(K\text{—}SiX_vR_w)_z \qquad (II)$$

wherein:

n and m are integers from 1 to 3 and o is an integer from 0 to 2, wherein $n+m+o$ is 4;

y is an integer from 1 to 3 and w is an integer from 0 to 2, wherein $y+w$ is 3;

u is an integer of at least 1 and z is an integer of at least 2;

B is a polyvalent organic group, wherein the valency of B is $u+z$;

L is a divalent organic group or a bond if Y is a vinyl group;

K is a divalent organic group or a bond.

Y comprises a functional group reactive with the epoxy groups and/or the (meth)acrylate groups if present of component (a) or the functional groups of component (b);

X is independently selected at each occurrence from chloro, alkoxy, acyloxy and oximino; and R is a hydrocarbyl group;

(d) a compound providing an expansion gas upon thermal decomposition; wherein the compounds as defined for (a) to (d) differ from each other, wherein the intumescent coating composition is liquid at 23° C. and atmospheric pressure and comprises less than 5 wt.-% based on the total weight of the composition of water.

Resin Component (a)

The polyepoxy-functional compound (a1) is not particularly limited. It includes, but is not limited to oligomeric or polymeric compounds bearing a plurality of epoxy functional groups, for example epoxy resins.

Suitable epoxy resins for the resin component (a1) comprise at least one polyepoxide. The polyepoxide has at least two 1,2-epoxy groups. Usually the epoxy equivalent weight of the polyepoxide ranges from 80 to 6000, typically 100 to 700. Epoxy compounds can be saturated or unsaturated, cyclic, aliphatic, alicyclic, aromatic or heterocyclic. They may comprise substituent(s), such as halogen, hydroxy, and ether groups.

The examples of polyepoxides are, for example, polyglycidyl ether of polyphenols, such as 2,2-bis(4-hydroxyphenyl)propane (bisphenol A), resorcinol, hydroquinone, benzenedimethol, phloroglucinol, bisphenol F, and catechol; or polyglycidyl ether of polyols, such as alicyclic polyols, such as 1,2-cyclohexane diol, 1,4-cyclohexane diol, 2,2-bis(4-hydroxycyclohexyl)propane, 1,1-bis(4-hydroxycyclohexyl) ethane, 2-methyl-1,1-bis(4-hydroxycyclohexyl)propane, 2,2-bis(4-hydroxy-3-tert-butylcyclohexyl)propane, 1,3-bis (hydroxymethyl)cyclohexane and 1,2-bis(hydroxymethyl) cyclohexane. The examples of aliphatic polyols include, in particular, trihydroxymethylpentane diol, ethylene glycol, diethylene glycol, triethylene glycol, 1,2-propylene glycol, 1,4-butyleneglycol, 1,5-pentanediol, 1,2,6-hexanetriol, cyclohexanedimethanol, glycerol, thrimethylolpropane, hydrogenated bisphenol A, hydrogenated bisphenol F or polyether glycols, for example, poly(oxytetramethylene) glycol, poly(oxyethylene) glycol, poly(oxypropylene) glycol and neopentane diol.

A particular suitable polyepoxide has an epoxy equivalent weight of less than 300 g/equivalent. The example includes EPON 828, which is commercially available from Hexion Inc.

Another group of suitable epoxy resins include polyglycidyl ethers of polycarboxylic acids, formed by the reaction of an epoxy compound such as epichlorohydrin with an aliphatic or aromatic polycarboxylic acid such as oxalic acid, succinic acid, glutaric acid, terephthalic acid, 2,6-napthalene dicarboxylic acid, or dimerised linoleic acid.

Other suitable epoxy resins that can be used according to the present invention comprise epoxidized olefinically unsaturated alicyclic materials such as epoxy alicyclic ethers and esters, epoxy resins containing oxyalkylene groups, epoxy novolac resins, which are prepared by reacting an epihalohydrin with the condensation product of an aldehyde with a monohydric or polyhydric phenol such as epoxy phenol novolac resins or epoxy cresol novolac resins.

Furthermore, it can be advantageous according to the present invention to employ a flexible polyepoxide resin as polyepoxy-functional compound (a1) of the intumescent coating composition of the present invention. These resins are generally essentially linear materials, although a small amount of branching is tolerated. Exemplary of suitable materials are epoxidized soybean oil, dimer acid-based materials such as EMPOL 1010 resin, which is commercially available from BASF SE, Ludwigshafen Germany and rubber-modified polyepoxide resins such as the product prepared from a polyglycidyl ether of bisphenol A and an acid-functional polybutadiene.

Other suitable examples of flexible polyepoxides for use according to the present invention include an epoxy-functional adduct which is prepared from a flexible acid-functional polyester and polyepoxide.

The acid-functional polyester generally has an acid value of at least 10 mg KOH/g, generally from about 140 to about 350 mg KOH/g and suitably from about 180 to about 260 mg KOH/g, as determined by ASTM 974-87.

Linear polyesters are more suitable than branched polyesters for use herein. Acid-functional polyesters can be prepared by the polyesterification of an organic polycarboxylic acid or anhydride thereof with an organic polyol. Usually, the polycarboxylic acids and polyols are aliphatic or aromatic dibasic acids and diols.

The diols which are usually employed in making the polyester include alkylene glycols, such as ethylene glycol, diethylene glycol, neopentyl glycol and other diols such as hydrogenated bisphenol A, cyclohexanediol, cyclohexanedimethanol, caprolactonediol, for example, the reaction product of epsilon-caprolactone and ethylene glycol, hydroxy-alkylated bisphenols, polyether glycols, for example, poly (oxytetramethylene) glycol, poly(oxyethylene) glycol, poly (oxypropylene) glycol and the like. Polyols of higher functionality can also be used although diols are more suitable. Examples include trimethylolpropane, trimethylolethane, pentaerythritol, glycerol, isosorbide, tetramethyl cyclobutane diol and the like, as well as higher molecular weight polyols such as those produced by oxyalkylating lower molecular weight polyols.

The acid component of the polyester comprises monomeric dicarboxylic acids or anhydrides having 2 to 36 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, tetrabromomphthalic acid, decanedioic acid, dodecanedioic acid, rosin acids, diphenolic acid, gallic acid, and other dicarboxylic acids of varying types, for example, Diels-Alder adducts of unsaturated $C_{18}$ fatty acids.

The polyester may include minor amounts of monobasic acids such as benzoic acid, stearic acid, acetic acid, hydroxystearic acid and oleic acid. Also, there may be employed higher polycarboxylic acids such as trimellitic acid. Where acids are referred to above, it is understood that anhydrides of those acids which form anhydrides can be used in place of the acid. Also, lower alkyl esters of the acids such as dimethyl glutarate and dimethyl terephthalate can be used.

According to the present invention, the polyester used to make the epoxy-functional adduct may be prepared from a polycarboxylic acid component comprising a polycarboxylic acid or mixture of acids having from 7 to 16 carbon atoms and a polyol component comprising a portion of diethylene glycol.

The polyepoxides that are used to prepare the epoxy-functional adduct of flexible acid-functional polyester and polyepoxide can be selected from those as defined above for the polyepoxide-functional component according to the present invention.

Other suitable polyepoxy-functional compounds are epoxy functional acrylic resins. Such resins can be prepared by free-radical addition polymerization of (meth)acrylic monomers, optionally in combination with vinyl monomers or other monomers comprising at least one carbon-carbon double bond, wherein the monomer composition comprises at least one epoxy functional compound having a one carbon-carbon double bond.

Suitable epoxy-functional ethylenically unsaturated monomers may be selected from glycidyl (meth)acrylate, allyl glycidylether, vinyl glycidylether, vinyl cyclohexene oxide, limonene oxide, 2-ethylglycidylacrylate, 2-ethylglycidylmethacrylate, 2-(n-propyl)glycidylacrylate, 2-(n-propyl)glycidylmethacrylate, 2-(n-butyl)glycidylacrylate, 2-(n-butyl)glycidylmethacrylate, glycidylmethylmethacrylate, glycidylacrylate, (3',4'-epoxyheptyl)-2-ethylacrylate, (3',4'-epoxyheptyl)-2-ethylmethacrylate, (6',7'-epoxyheptyl)acrylate, (6',7'-epoxyheptyl)methacrylate, allyl-3,4-epoxyheptylether, 6,7-epoxyheptylallylether, vinyl-3,4-epoxyheptylether, 3,4-epoxyheptylvinylether, 6,7-epoxyheptylvinylether, o-vinylbenzylglycidylether, m-vinylbenzylglycidylether, p-vinylbenzylglycidylether, 3-vinyl cyclohexene oxide, alpha-methyl glycidyl methacrylate, 3,4-epoxycyclohexylmethyl (meth)acrylate and combinations thereof. Glycidyl (meth)acrylate is particularly suitable.

Suitable additional monomers for the preparation of the epoxy-functional acrylic resin can be selected from ethylenically unsaturated nitrile compounds;

vinyl aromatic monomers;

alkyl esters of ethylenically unsaturated acids;

hydroxyalkyl esters of ethylenically unsaturated acids;

amides of ethylenically unsaturated acids;

ethylenically unsaturated acids;

ethylenically unsaturated sulfonic acid monomers and/or ethylenically unsaturated phosphorous-containing acid monomers vinyl carboxylates;

conjugated dienes;

monomers having at least two ethylenically unsaturated groups; and combinations thereof.

Examples of ethylenically unsaturated nitrile monomers which can be used for the preparation of the epoxy-functional acrylic resin include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile, alpha-cyanoethyl acrylonitrile, fumaronitrile and combinations thereof, with acrylonitrile being particularly suitable.

Representatives of vinyl-aromatic monomers include, for example, styrene, α-methylstyrene, p-methylstyrene, t-butylstyrene and vinyltoluene. Suitably, the vinyl-aromatic monomers are selected from styrene, alpha-methyl styrene and combinations thereof.

Esters of (meth)acrylic acid that can be used for the preparation of the epoxy-functional acrylic resin include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pivalic acid and hydroxyalkyl (meth) acrylate and alkoxyalkyl (meth)acrylate monomers.

In general, suitable alkyl esters of (meth)acrylic acids may be selected from $C_1$-$C_{20}$ alkyl (meth)acrylate, suitably $C_1$-$C_{10}$-alkyl (meth)acrylates. Examples of such acrylate monomers include n-butyl acrylate, secondary butyl acrylate, methyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. It is particularly suitable to select the esters of (meth)acrylic acids from methyl (meth)acrylate, ethyl (meth)acrylate, propyl (meth)acrylate, butyl (meth) acrylate, 2-ethylhexyl (meth)acrylate and combinations thereof.

The hydroxy alkyl(meth)acrylate monomers which can be used for the preparation of the epoxy-functional acrylic resin include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Suitably, the hydroxy alkyl(meth) acrylate monomer is selected from 2-hydroxy ethyl (meth) acrylate.

Amides of ethylenically unsaturated acids that can be used for the preparation of the epoxy-functional acrylic resin include acrylamide, methacrylamide, and diacetone acrylamide. A particularly suitable amide monomer is (meth) acrylamide. Vinyl ester monomers which can be used to prepare the epoxy-functional acrylic resin include vinyl acetate, vinyl proprionate, vinyl butyrate, vinyl benzoate, vinyl-2-ethylhexanoate, vinyl stearate, and the vinyl esters of versatic acid. The particularly suitable vinyl ester is vinyl acetate.

The ethylenically unsaturated carboxylic acid monomers suitable for the preparation of the epoxy-functional acrylic resin include monocarboxylic acid and dicarboxylic acid monomers and monoesters of dicarboxylic acid. Carrying out the present invention, it is particularly suitable to use ethylenically unsaturated aliphatic mono- or dicarboxylic acids or anhydrides which contain from 3 to 5 carbon atoms. Examples of monocarboxylic acid monomers include acrylic acid, methacrylic acid, crotonic acid and examples of dicarboxylic acid monomers include fumaric acid, itaconic acid, maleic acid and maleic anhydride. Examples of other suitable ethylenically unsaturated acids include vinyl acetic acid, vinyl lactic acid, vinyl sulfonic acid, 2-methyl-2-propene-1-sulfonic acid, styrene sulfonic acid, acrylamidomethyl propane sulfonic acid and the salts thereof. Suitably, the ethylenically unsaturated carboxylic acid monomers are selected from (meth)acrylic acid, crotonic acid, itaconic acid, maleic acid, fumaric acid and combinations thereof.

Conjugated diene monomers suitable for the preparation of the epoxy-functional acrylic resin include conjugated diene monomers, selected from 1,3-butadiene, isoprene, 2,3-dimethyl-1,3-butadiene, 2,3-dimethyl-1,3-butadiene, 2-chloro-1,3-butadiene, 1,3-pentadiene, 1,3-hexadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1,3-butadiene, 2-amyl-1,3-butadiene, 3,7-dimethyl-1,3,7-octatriene, 3,7-dimethyl-1,3,6-octatriene, 3,7,11-trimethyl-1,3,6,10-dodecatetraene, 7,11-dimethyl-3-methylene-1,6,10-dodecatriene, 2,6-dimethyl-2,4,6-octatriene, 2-phenyl-1,3-butadiene and 2-methyl-3-isopropyl-1,3-butadiene and 1,3-cyclohexadiene. 1,3-Butadiene, isoprene and combinations thereof are particularly suitable conjugated dienes.

It is also possible to use a combination of two or more, such as three or more or four or more, different polyepoxy-functional compounds in resin component (a1) that may be selected from those as disclosed above.

Suitable polyepoxy-functional compounds according to the present invention may be selected from diglycidyl ether of bisphenol A, diglycidyl ether of bisphenol F, resorcinol diglycidyl ether, epoxy phenol novolac resin, epoxy cresol novolac resins, epoxy functional (poly)siloxanes, epoxy functional polysilfides, epoxy-functional adducts of acid-functional polyesters and polyepoxides, for example, those that are described above.

The beta-hydroxy ester of (meth)acrylic acid (a2) optionally present in the resin component (a) of the intumescent coating compositions of the present invention may comprise a plurality of beta-hydroxy ester of (meth)acrylic ester groups resulting from the reaction of a polyepoxide with (meth)acrylic acid. The polyepoxide can be reacted with the (meth)acrylic acid in an epoxy-carboxylic acid equivalent ratio of 1:0.1 to 1:1.2, suitably 1:0.5 to 1:1.2 more suitably 1:1 to 1:1.05.

The polyepoxides that can be used for the reaction product of polyepoxide with (meth)acrylic acid can be selected from those polyepoxides as disclosed above with respect to component (a1) of the intumescent coating composition of the present invention. Particularly suitable epoxides that can be used for making the beta-hydroxy ester of (meth)acrylic acid (component (a2) of the intumescent coating composition according to the present invention are selected from diglycidyl ether of bisphenol A, diglycidyl ether of bisphenol F, epoxy phenyl novolac resins, epoxy cresol novolac resins, epoxy-functional acrylic resins, epoxy-functional polyester or combinations thereof.

A particularly suitable beta-hydroxy ester of (meth)acrylic acid is the reaction product of EPIKOTE 828 (reaction product of bisphenol A with epichlorohydrin) with acrylic acid, commercially available from Allnex as EBE-CRYL 3720).

In addition, or alternatively to the beta-hydroxy ester of (meth)acrylic acid (a2), a (meth)acrylate-functional compound (a3) different from compound (a2) may be present in resin component (a). Thereby, the viscosity of the intumescent coating composition of the present invention can be suitably adjusted. Thus, it is believed that the optional component (a3) functions as a reactive diluent in the intumescent coating composition of the present invention. The optional (meth)acrylate-functional component (ii) of the intumescent coating composition of the present invention may be selected from poly(meth)acrylates of 1,4-butanediol, neopentyl glycol, ethylene glycol, 1,2-propanediol, 1,3-propanediol, 2,2,4-trimethyl-1,3-pentanediol, 1,6-hexanediol, 1,4-cyclohexane dimethanol, para-xylene glycol, 1,4-cyclohexane diol, trimethylolethane, trimethylolpropane, pentaerythritol, polyether glycols, for example, poly(oxytetramethylene) glycol, poly(oxyethylene) glycol, poly(oxypropylene) glycol and combinations thereof.

The present inventors found out that the addition of the beta-hydroxy ester of (meth)acrylic acid (a2) and/or the (meth)acrylate-functional compound (a3) different therefrom results in a considerable increase of curing rate of the coating composition.

Without wanting to be bound by theory, it is believed that this increase in curing rate is due to the Michael addition reaction between the acrylic group of the beta-hydroxy ester of (meth)acrylic acid (i) or the (meth)acrylate-functional compound (ii) different therefrom and the polyamine and/or the polythiol-functional compound.

In the intumescent coating composition of the present invention the polyepoxy-functional compound (a1) may be present in an amount of 20 to 95 wt.-%, suitably 40 to 95 wt.-%, and the beta-hydroxy ester of (meth)acrylic acid (a2) may be present in an amount of 5 to 80 wt.-%, suitably 5 to 60 wt.-%, whereby the weight percentage is based on the total weight of polyepoxy-functional compound (a1) and beta-hydroxy ester(s) of (meth)acrylic acid (a2).

Furthermore, in the intumescent coating composition of the present invention, the polyepoxy-functional compound (a1) may be present in an amount of 25 to 95 wt.-%, suitably 40 to 95 wt.-%, the beta-hydroxy ester of (meth)acrylic acid (a2) may be present in an amount of 5 to 75 wt.-%, suitably 5 to 60 wt.-%, and the (meth)acrylate-functional compound (a3), different from compound (a2), may be present in an amount 0 to 50 wt.-%, suitably 5 to 30 wt.-%, wherein the weight percentages are based on the total weight of compounds (a1), (a2) and (a3).

In the intumescent coating composition of the present invention, the amount of the resin component (a) may be 10-40 wt.-%, based on the total solid weight of the intumescent coating composition, such as 15-38 wt.-%, 22-36 wt.-%, or 23-30 wt.-%. Alternatively, the amount of the polymer in the coating composition of the present invention may be 10, 11, 12, 13, 14, 15, 16, 17, 18, 19 wt.-% to 30, 31, 32, 33, 34, 35, 36, 37, 38, 39, 40 wt.-%. The endpoints of the above ranges can be arbitrarily combined to define the amount of the polymer in the intumescent coating composition of the present invention.

Crosslinker Component (b)

There is no particular limit to the crosslinker component (b) used in the curable intumescent coating composition according to the present invention, as long as it contains at least one compound (b1) bearing a plurality of functional groups that are reactive with the epoxy groups of the polyepoxy-functional compound (a1). Curing can take place either at ambient temperature or upon application of heat, wherein curing at ambient temperature is particularly suitable for the intumescent coating composition according to the present invention.

Suitable Compounds (b1) May be Selected from
  a polyamine-functional compound suitably selected from
    an aliphatic polyamine, an aromatic polyamine, poly
    (amine-amides), and combinations thereof: or
  a polythiol-functional compound suitably selected from
    polysulfide thiols, polyether thiols, polyester thiols,
    pentaerythritol based thiols; or
  combinations thereof.

The polyamine curing agent can be selected from aliphatic polyamines, aromatic polyamines, polyamine amides, polyetheramines, for example those commercially available from Huntsman Cooperation, The Woodlands, Texas, polysiloxane amines, polysulfide amines or combinations thereof. Examples include diethylene triamine, 3,3-amino-bis-propylamine, triethylene tetraamine, tetraethylene pentamine, m-xylylenediamine, isophorone diamine, 1,3-bis (aminoethyl)cyclohexane, bis(4-aminocyclohexyl)methane, N-aminoethyl piperazine, 4,4'-diaminodiphenyl methane, 4,4'-diamino-3,3'-diethyl diphenyl methane and diamino diphenylsulphone and the reaction product of a polyamine and an aliphatic fatty acid such as the series of materials sold by BASF under the trademark VERSAMID can be used, the latter being particularly suitable.

In addition, adducts of any above polyamines can also be used. The adduct of polyamine is formed by reacting polyamine with a suitable reactive compound, such as an epoxy resin. This reaction will decrease the content of free amine in the curing agent, making it more useful at low temperature and/or high humidity environment.

As a curing agent, various polyetheramines, such as various Jeffamines available from Huntsman Corp., including, but not limited to, Jeffamine D-230, Jeffamine D-400, Jeffamine 600, Jeffamine 1000, Jeffamine 2005 and Jeffamine 2070, etc, can also be used. As a curing agent, various polyamides can also be used. Generally, polyamides contain reaction products of dimer fatty acid and polyethyleneamine, and small amounts of monomer fatty acid. Dimer fatty acid is prepared by the oligomerization of monomer fatty acid. Polyethyleneamine can be any higher polyethyleneamine, such as diethylenetriamine, triethylenetetraamine, tetraethylenepentaamine, etc., wherein the most commonly used is diethylenetriamine. When polyamides are used as the curing agent, it can make the coating have a good balance between corrosion resistance and waterproof property. Further, polyamides can also make the coating have good flexibility, proper curing rate and other advantageous factors.

The polythiol compounds may be selected from polysulfide thiols, polyether thiols, polyester thiols, pentaerythritol based thiols; or combinations thereof. A particularly suitable polythiol compound is Thioplast© G4, commercially available from Akzo Nobel Functional Chemicals GmbH&Co KG, Greiz, Germany.

In the intumescent coating composition of the present invention, the equivalent ratio of the combined functional groups such as epoxy groups and (meth)acrylate groups in component (a) to the functional groups in compound (b1) may be from 2:1 to 1:2, suitably from 1.05:1.0 to 1:2, particularly suitable from 1:1.4 to 1:2.

In the intumescent coating composition of the present invention, the amount of compound (b1) is typically 10-30 wt.-%, based on the total solids weight of the intumescent coating composition, such as 15-20 wt.-%, 16-19 wt.-%, or 17-19 wt.-%. Alternatively, the amount of the compound (b1) in the coating composition of the present invention may be 10, 11, 12, 13, 14 or 15 wt.-% to 18, 19, 20, 21, 22, 23, 24 or 25 wt.-%. The endpoints of the above ranges can be arbitrarily combined to define the amounts of various curing agents in the intumescent coating composition of the present invention.

The intumescent coating composition of the present invention can also comprise a curing promoter. A curing promoter is a kind of material which can accelerate the curing of the resins, lower the curing temperature, shorten the curing time. Typical curing promoters include aliphatic amine promoters, such as triethanolamine, triethylenediamine, etc.; anhydride promoters, such as BDMA, DBU, etc.; polyetheramine catalysts; tin promoters, such as dibutyltin dilaurate, stannous octoate, etc. In one embodiment of the present invention, the curing promoter is ANCAMINE K54, which is commercially available from Air Products.

Suitable amounts of curing promoters are 0.1 to 5 wt.-%, more suitably 1 to 3 wt.-% based on the total solids weight of the intumescent coating composition.

The crosslinker component (b) of the intumescent coating composition of the present invention may further comprise a compound (b2) than can undergo condensation reactions optionally in presence of moisture with the Si—X functionality of the organo silane compound (c) of the intumescent coating composition of the present invention. Suitable compounds (b2) may be selected from silanes of formula (III) or (IV), $$R_k SiX_1 \tag{III}$$

$$R_m X_{3-m} SiR'SiR_n X_{3-n} \tag{IV}$$

wherein R' is defined as an alkyl group of 1 to 20 carbon atoms, more suitably 1 to 4 carbon atoms, R and X are defined as for the organo silane compound (c) of the intumescent coating composition according to the present invention including the particularly suitable embodiments for (c) as will be discussed below, and k is an integer of 0 to 2, 1 is an integer of 2 to 4 and the sum of k+1 is 4.

m and n are integers of 0-2, m+n is below or equal to 3.

Particularly suitable compounds (b2) may be selected from tetraalkoxy silanes, hydrocarbyl trialkoxy silanes and dihydrocarbyl dialkoxy silanes, wherein the hydrocarbyl groups may be suitable selected from $C_1$-$C_4$ alkyl and phenyl und the alkoxy groups may be suitably selected from $C_1$-$C_4$ alkoxy.

The compound (b2) may be present in an amount 0 to 5 wt.-% suitably 0.1 to 4 wt.-%, more suitably 0.5 to 4 wt.-%, even more suitably 0.5 to 3 wt.-% based on the total solids weight of the intumescent coating composition. It is particularly suitable if compound (b2) is absent.

Organo Silane Compound (c):

Organo silane compounds (c) useful in the intumescent coating composition according to the present invention are defined above. Suitable organo silane compound (c) present in the intumescent coating composition of the present invention may be selected from organo silane compounds of the formula (I) or (II), wherein L is selected from alkylene and cycloalkylene groups having 1 to 10 carbon atoms, suitably 2 to 6 carbon atoms and a bond if Y is a vinyl group; and/or K is selected from alkylene and cycloalkylene groups having 1 to 10 carbon atoms, suitably 2 to 6 carbon atoms and a bond; and/or Y is selected from an epoxy containing group, an amino group, a polyamino group, an amido group, a thiol group, a carboxylic acid group, a hydroxy group, a (meth)acryloxy group and a vinyl group; and/or X is selected from alkoxy groups having suitably 1 to 4 carbon atoms, chloro, acyloxy and oximino groups, suitably from alkoxy groups having 1 to 4 carbon atoms; and/or R is a $C_1$ to $C_4$ alkyl group; and/or B is a polyvalent alkyl group; and/or n is 1, o is 0 and m is 3; and/or u is 1 and z is 2.

Suitable organo silane compounds may selected from vinyl trialkoxysilane, 3-glycidoxypropyl trialkoxysilane, 3-(meth)acryloxypropyl trialkoxysilane, aminoalkyl trialkoxysilane, aminoalkyl di alkyl monoalkoxysilane, bis-(aminoalkyl) dialkoxysilane, thiolalkyl trialkoxysilane, thiolalkyl alkyl dialkoxysilane, thiolalkyl di alkyl monoalkoxysilane and combinations thereof. Other suitable organo silane compounds are compounds according to formula (II) wherein z is 2, known to the person skilled in the art as dipodal silanes, which are also commercially available. Particularly suitable silane compounds (c) may be selected from vinyl trimethoxysilane, vinyl triethoxysilane, vinyl triacetoxy silane, vinyltris(2-butylidenaminooxy)silane, 3-glycidoxypropyl trimethoxysilane, 3-glycidoxypropyl triethoxy silane, 3-(meth)acryloxypropyl trimethoxysilane, 3-(meth)acryloxypropyl triethoxysilane, 3-aminopropyl trimethoxysilane, 3-aminopropyl triethoxysilane, 3-aminopropyl dimethyl methoxysilane, bis-(3-aminopropyl) dimethoxysilane, thiolethyl trimethoxysilane, N-[3-(trimethoxysilyl)propyl] ethylenediamine, N-[3-(trimethoxysilyl)propyl]diethylenetriamine, β-(3,4-epoxycyclohexyl)ethyl trimethoxysilane, bis[3-(trimethoxysilyl)propyl]amine.

The coating composition of any of the preceding aspects, wherein the amount of the organo silane compound (c) is 5 to 18 wt.-%, suitably 10 to 18 wt.-% based on the total weight of the intumescent coating composition. Suitable lower limits for the range of the amount of the organo silane compound (c) may be at least 5, at least 5,5, at least 6, at least 6.5, at least 7, at least 7.5, at least 8, at least 8.5, at least 9,5, at least 10, at least 10.5, at least 11, at least 11.5, at least 12, at least 12.5, at least 13, at least 13.5, at least 14, at least 14.5, at least 15 wt.-% based on the total weight of the intumescent coating composition. Suitable upper limits for the range of the amount of the organo silane compound (c) may be at most 20, at most 19.5, at most 19, at most 18.5, at most 18, at most 17.5, at most 17, at most 16.5, at most 16, at most 15.5, at most 15, at most 14.5, at most 14, at most 13.5, at most 13, at most 12.5, at most 12, at most 11.5, at most 11, at most 10.5, at most 10 wt.-% based on the total weight of the intumescent coating composition. The person skilled in the art will appreciate that any range defined by any one of the above lower limits and any one of the above upper limits is disclosed herein.

The intumescent coating composition of the present invention further comprises, as component (d), a compound providing an expansion gas upon thermal decomposition.

The expansion gas serves to cause the fire-protective intumescent composition to foam and swell when exposed to high temperature of flames. As a result of this expansion, the char which is formed is a thick, multicelled material which serves to insulate and protect the underlying substrate. The source of expansion gas that may be used in the intumescent coating composition of the present invention is a nitrogen-containing material. Examples of suitable nitrogen-containing materials include melamine, salts of phosphoric acid, guanidine, methylolated melamine, hexamethoxymethyl melamine, urea, dimethylurea, melamine pyrophosphate, dicyandiamide, guanylurea phosphate and glycine. Suitably, melamine is used. Other conventional sources of expansion gas can also be used such as those materials which liberate carbon dioxide. Examples are alkaline earth metals such as calcium carbonate or magnesium carbonate. Compounds which release water vapor as they decompose upon heating, for example calcium hydroxide, magnesium dihydroxide or aluminum trihydroxide, may also be used. Other examples of such compounds are boric acid and boric acid derivatives such as boric acid esters and metal borates.

A suitable amount of component (d) in the intumescent coating composition of the present invention may range from 0.1 to 25 wt.-%, suitably 1 to 10 wt.-%, whereby the weight percentage is based on the total solids weight of the composition.

The intumescent coating composition of the present invention may comprise optional additives (f) that are selected from a phosphorous source, a boron source, a zinc source, an acid source, a metal oxide, for example pre-hydrolysed tetraethylorthosilicate, aluminum oxide, titanium isopropoxide, a carbon source, inorganic fillers, mineral fibers, for example CHOPVANTAGE from PPG, Coatforce or Roxul fibers from Lapinus, rheology additives, organic solvents, pigments, foam stabilizers, and combinations thereof.

The optional source of phosphorous can be selected from a variety of materials, such as, for example, phosphoric acid, mono- and diammonium phosphate, tris-(2-chloroethyl) phosphate, phosphorus-containing amides such as phosphorylamide, and melamine pyrophosphate. Suitably, the source of phosphorous is an ammonium polyphosphate represented by the formula $(NH_4)_{n+2}P_n O_{3n+1}$, wherein n is an integer of at least 2, suitably n is an integer of at least 50. The intumescent coating composition of the present invention may contain an amount of phosphorous in the range of 0.05 to 30 wt.-%, suitably 0.5 to 10 wt.-%, based on the total solid weight of the coating composition. The phosphorous is believed to function as a char promoter in the intumescent composition.

The optional source of zinc can be selected from a variety of materials. It is believed that the zinc material contributes to the formation of a small-celled structure in the char. The small cells of the char afford better insulation of the substrate and are better able to retain the char's integrity and adhere to the substrate even in the absence of external reinforcing materials. Thus, cracking of the char and its breaking away from the substrate are minimized and a greater measure of protection is afforded to the underlying steel. Examples of suitable materials which are sources of zinc include zinc oxide, zinc salts, such as zinc borate and zinc phosphate, zinc carbonate; also zinc metal can be used. Suitably, zinc borate is utilized. The intumescent coating composition of the present invention may contain an amount of zinc in the range from 0.1 to 25 wt.-%, suitably 0.5 to 12 wt.-%, based on the total solids weight of the composition.

The source of boron may be selected from ammonium pentaborate or zinc borate, boron oxide, borates such as sodium borate, potassium borate and ammonium borate, borate esters such as butyl borates or phenyl borates and combinations thereof. The intumescent coating composition of the present invention may contain an amount of boron in the range from 0.1 to 10 wt.-%, suitably 1 to 6 wt.-%, whereby the weight percentage is based on the total solids weight of the composition.

The acid source may be selected from ammonium phosphate, ammonium polyphosphate, diammonium diphosphate, diammonium pentaborate, phosphoric acid-generating materials, boric acid, metal or organic borates and combinations thereof. The total amount of acid source, if present, may be 5 to 30 wt.-%, based on the total solids weight of the coating composition.

The intumescent coating composition of the present invention further comprises a carbon source. The carbon source transforms into char upon exposure to fire or heat, thereby forming an anti-fire protective layer on the substrate. According to the present invention, carbon sources can be, for example, aromatic compounds and/or tall oil fatty acids (TOFA) and/or polyhydroxy compounds such as pentaerythritol, dipentaerythritol, glycerol, oligomeric glycerol, xylitol, mannitol, sorbitol and polymers such as polyamides, polycarbonates, polyurethanes, and combinations thereof. The inventors of the present invention have surprisingly found that when carbon sources including aromatic compounds and/or tall oil fatty acids are used as the carbon source in intumescent coating composition of the present invention, the resultant intumescent coating will not only have comparable or even better anti-fire properties than the similar type of intumescent coatings but can also maintain these required properties after undergone low temperatures. It will also be appreciated that the polymer may also be a carbon source.

In the intumescent coating composition of the present invention, the amount of the carbon source can be up to 18 wt.-%, based on the total weight of the intumescent coating composition, such as 5-18 wt.-%, 11-17 wt.-%, or 12-16 wt.-%. Alternatively, the amount of the carbon source in the coating composition of the present invention can be 5, 6, 7, 8, 9, 10, 11, 12, 13 wt.-% to 15, 16, 17, 18 wt.-%. The endpoints of the above ranges can be arbitrarily combined to define the amounts of various carbon sources in the intumescent coating composition of the present invention.

It should be understood that the phosphorus, zinc, boron and expansion gas can each be provided by a separate source material or, alternatively, a single material may be a source of more than one of the aforelisted additional components. For example, melamine pyrophosphate can provide a source of both phosphorus and expansion gas.

The optional reinforcing fillers (e) may be chosen from among a large array of conventionally utilized materials, including fibrous reinforcements and platelet reinforcements, which are suitable over other fillers. Examples of fibrous reinforcements include glass fibers, ceramic fibers, e.g., aluminum oxide/silicon oxide, and graphite fibers. Platelet reinforcements include hammer-mill glass flakes, mica, and wollastonite. Other suitable fillers include metal oxides, titanium oxides, clay, talc, silica, diatomaceous earth, Lapinus® fibers and various pigments. The reinforcing filler is believed to assist in controlling expansion of the fire-protective composition prior to and during char formation so that the resultant char is hard and uniform.

One advantage of the present invention is, that the intumescent coating composition is tintable without compromising the fire protection and mechanical properties of the cured intumescent coating. In particular the reinforcing fillers for example white reinforcing fillers do not have to be present in order to provide a hard and uniform char. Thus, in the intumescent coating composition the amount of white pigments and/or fillers selected from aluminum oxides, silicon oxide, mica, wollastonite, titanium oxides, clay, talc, and diatomaceous earth compounds may be less than 2 wt.-%, suitably between 0-0.1 wt.-% based on the total weight of the composition, and the amount of colored pigments, particularly black pigments may be at least 0.5 wt.-%, suitably between 1-5 wt.-% based on the total weight of the composition.

The intumescent coating composition of the present invention may also contain a variety of conventional additives, such as rheology additives, organic solvents, foam stabilizers, pigments, flame spread control agents, and the like. These ingredients are optional and can be added in varying amounts. In particular the intumescent coating composition according to the present invention is liquid at 23° C. and atmospheric pressure (i.e. 1 bar) and is substantially non-aqueous i.e. contains less than 5 wt.-%, suitably less than 3 wt.-%, more suitable less than 1 wt.-% based on the total weight of the intumescent coating composition or even no intentionally added water.

As mentioned above the crosslinked intumescent coating expands at a temperature above the activation temperature to induce thermal decomposition of compound (c) and optionally is charred. Upon the action of heat and fire, the expanded foam starts to char, wherein the resin material and optionally present additional carbon sources form a porous carbon network that exhibits stability at high temperatures and provides for thermal insulation in order to prevent or at least inhibit for a prolonged period of time a thermal runaway of the battery or individual battery cells.

The intumescent coating composition may be configured as two-package system, wherein component (a) is comprised in a first package (A);

component (b) is comprised in a second package (B);

compound (c) is comprised in a third package (C) or if Y— is a functional group reactive with the compounds in component (a) compound (c) is present in the second package (B) or if Y— is a functional group reactive with the compounds in component (b) compound (c) is present in the first package (A)

the compound providing an expansion gas upon thermal decomposition (d) and any of the additives (e) and (f) if present are comprised in any combination in either package (A), (B) or (C) or in any combination of these packages or are comprised in one or more further packages (D); wherein the packages are mixed immediately prior to application of the coating composition.

It is particularly suitable that the composition be solvent-free and spray-applied. If desired, thinning can be accomplished with a variety of conventional solvents such as, xylene, methylene chloride or 1,1,1-trichloroethane.

The intumescent coating composition of the present invention may be applied to provide the various dry coating thicknesses as desired. Suitable dry coating thicknesses can range from 10-20,000 microns, such as 50-5000 microns, such as 100-2000 microns.

In a method for coating a substrate the intumescent coating composition of the present invention is at least partial applied to a substrate and subsequently optionally cured. Suitable substrate may be selected from a metal substrate, suitably selected from aluminum and steel substrates or plastic substrate suitably selected from polycarbonate. In particular, the intumescent coating composition of the present invention can be applied to a structural element of a battery, in particular lithium ion battery. The battery may comprise exterior wall elements defining a housing and optionally interior wall elements, wherein the intumescent coating composition is at least partially applied to the external and/or internal side of any of the exterior wall elements and/or to any side of any of the interior wall elements, if present. The exterior wall and/or interior wall elements may comprise a material selected from any of composite, steel, aluminum and polycarbonate.

The battery, in particular lithium ion battery, may be a battery pack comprising a plurality of individual battery cells, wherein the crosslinked intumescent coating is positioned to thermally insulate at least some of the individual battery cells from each other in the expanded and optionally charred state. In addition, the intumescent coating composition may be applied to the housing walls and interior dividing walls of the battery pack as discussed above.

In order to provide fire protection for articles comprising a battery and their users it is also within the ambit of the present invention to apply the intumescent coating composition to a part of an article adjacent to the battery between the battery and the article to insulate the article from the battery. In such cases a conventional battery or a battery according to the present invention can be employed. The article may be, for example, a mobile phone, a tablet or a laptop computer.

Alternatively, the article may be a vehicle such as a hybrid or electric car, bus or truck. In such vehicles it is common to position the battery, especially the lithium ion battery, due to its weight as a flat battery pack underneath the floor portion of the vehicle body, for example the car body. In such cases, the intumescent coating of the present invention may be applied to the floor portion of the vehicle adjacent to the battery between battery and the vehicle body. Thereby, in an event of a thermal runaway of the battery or a battery fire, the car body, especially the passenger cabin, is protected by the crosslinked intumescent coating so that the fire will not spread into the passenger cabin and the heat-up of the passenger cabin will be limited for a prolonged period of time so that the passengers will have sufficient time to safely escape from the vehicle in case of such an incident.

The present invention is defined by the following aspects:

1. An intumescent coating composition comprising:
   (a) a resin component comprising
      (a1) a polyepoxy-functional compound and optionally;
      (a2) a beta-hydroxy ester of (meth)acrylic acid; and/or
      (a3) a (meth)acrylate-functional compound different from compound (a2);
   (b) a crosslinker component comprising at least one compound (b1) bearing a plurality of functional groups that are reactive with the epoxy groups of the polyepoxy-functional compound;
   (c) 5 to 20 wt.-% based on the total weight of the intumescent coating composition of an organo silane compound selected from organo silane compounds of formula (I) or (II) and combinations thereof $$(Y\text{-}L\text{-})_n\text{—}SiX_mR_o \qquad (I),$$

$$(Y\text{-}L)_u\text{-}B\text{—}(K\text{—}SiX_vR_w)_z \qquad (II)$$

wherein:
   n and m are integers from 1 to 3 and o is an integer from 0 to 2, wherein n+m+o is 4;
   y is an integer from 1 to 3 and w is an integer from 0 to 2, wherein y+w is 3;
   u is an integer of at least 1 and z is an integer of at least 2;
   B is a polyvalent organic group, wherein the valency of B is u+z;
   L is a divalent organic group or a bond if Y is a vinyl group;
   K is a divalent organic group or a bond.
   Y comprises a functional group reactive with the epoxy groups and/or the (meth)acrylate groups if present of component (a) or the functional groups of component (b);
   X is independently selected at each occurrence from chloro, alkoxy, acyloxy and oximino; and
   R is a hydrocarbyl group;
   (d) a compound providing an expansion gas upon thermal decomposition;
   wherein
   the compounds as defined for (a) to (d) differ from each other, wherein the intumescent coating composition is liquid at 23° C. and atmospheric pressure and comprises less than 5 wt.-% based on the total weight of the composition of water.

2. The coating composition of aspect 1, wherein
   for the organo silane compound of the formula (I) or (II)
      L is selected from alkylene and cycloalkylene groups having 1 to 10 carbon atoms, suitably 2 to 6 carbon atoms and a bond if Y is a vinyl group; and/or K is selected from alkylene and cycloalkylene groups having 1 to 10 carbon atoms, suitably 2 to 6 carbon atoms and a bond; and/or
      Y is selected from an epoxy containing group, an amino group, a polyamino group, an amido group, a thiol group, a carboxylic acid group, a hydroxy group, a (meth)acryloxy group and a vinyl group; and/or
      X is selected from alkoxy groups having suitably 1 to 4 carbon atoms; and/or
      R is a $C_1$ to $C_4$ alkyl group; and/or
      B is a polyvalent alkyl group; and/or
      n is 1, o is 0 and m is 3; and/or
      u is 1 and z is 2.

3. The coating composition of aspect 2, wherein the organo silane compound is selected from vinyl trialkoxysilane, 3-glycidoxypropyl trialkoxysilane, 3-(meth)acryloxypropyl trialkoxysilane, aminoalkyl trialkoxysilane, aminoalkyl di alkyl monoalkoxysilane, bis-(aminoalkyl) dialkoxysilane, thiolalkyl trialkoxysilane, thiolalkyl alkyl dialkoxysilane, thiolalkyl di alkyl monoalkoxysilane, N-[3-(trimethoxysilyl)propyl] ethylenediamine, β-(3,4-epoxycyclohexyl)ethyl trimethoxysilane and combinations thereof.

4. The coating composition of any of the preceding aspects, wherein the amount of the organo silane compound is 5 to 18 wt.-%, suitably 10 to 18 wt.-% based on the total weight of the intumescent coating composition.

5. The coating composition of any of the preceding aspects, wherein the polyepoxy-functional compound (a1) comprises diglycidyl ether of bisphenol A, diglygidyl ether of bisphenol F, an epoxy phenol novolac resin, an epoxy cresol novolac resin, epoxy functional acrylic resins, epoxy functional polyester or combinations thereof.

6. The coating composition of any of the preceding aspects, wherein the beta-hydroxy ester of (meth) acrylic acid (a2) is present and comprises a plurality of beta-hydroxy (meth)acrylic ester groups, resulting from the reaction of a polyepoxide, selected from diglycidyl ether of bisphenol A, diglygidyl ether of bisphenol F, an epoxy phenol novolac resin, an epoxy cresol novolac resin, epoxy functional acrylic resins, epoxy functional polyester or combinations thereof with (meth)acrylic acid, suitably the beta-hydroxy ester of (meth)acrylic acid (a2) comprises the product of the reaction of a polyepoxide with (meth)acrylic acid in an epoxy carboxylic acid equivalent ratio of 1:0.1 to 1:1.015.

7. The coating composition of any of the preceding aspects, wherein the (meth)acrylate-functional compound (a3) is present and selected from poly(meth) acrylates of 1,4-butanediol, neopentyl glycol, ethylene glycol, 1,2-propanediol, 1,3-propanediol, 2,2,4-trimethyl-1,3-pentanediol, 1,6-hexanediol, 1,4-cyclohexane dimethanol, para-xylene glycol, 1,4-cyclohexane diol, trimethylolethane, trimethylolpropane, pentaerythritol and combinations thereof.

8. The coating composition of any of the preceding aspects, wherein component (a) comprises
   20-100 wt.-%, suitably 40-95 wt.-% of the polyepoxy-functional compound (a1);
   0-75 wt.-%, suitably 5-60 wt. % of the beta-hydroxy ester of (meth)acrylic acid (a2); and
   0-50 wt.-%, suitably 5-30 wt.-% of the (meth)acrylate-functional compound (a3) different from compound (a2), wherein the weight percentages are based on the total weight of compounds (a1), (a2) and (a3).

9. The coating composition of any of the preceding aspects, wherein the component (b) comprises
   a polyamine-functional compound suitably selected from an aliphatic polyamine, an aromatic polyamine, poly(amine-amides), and combinations thereof: or
   a polythiol-functional compound suitably selected from polysulfide thiols, polyether thiols, polyester thiols, pentaerythritol based thiols; or
   combinations thereof.

10. The coating composition of any of the preceding aspects, wherein the equivalent ratio of the combined epoxy groups and (meth)acrylate groups in (a) to the functional groups in (b) is from 2:1 to 1:2, suitably 1.3:1.0 to 1.0:1.3.

11. The coating composition of any of the preceding aspects comprising pigments and/or fillers (e), wherein
    the total amount of white pigments and/or fillers selected from aluminum oxides, silicon oxide, mica, wollastonite, titanium oxides, clay, talc, and diatomaceous earth compounds is less than 2 wt.-%, suitably between 0-0.1 wt.-% based on the total weight of the composition, and
    the amount of colored pigments, particularly black pigments is at least 0.5 wt.-%, suitably between 1-5 wt.-% based on the total weight of the composition.

12. The coating composition of any of the preceding aspects, further comprising additives (f) selected from a phosphorous source, a boron source, a zinc source, an acid source, a carbon source, rheology additives, organic solvents, pigments, foam stabilizers, adhesion promoters, corrosion inhibitors, UV stabilizers and combinations thereof.

13. The coating composition of any of the preceding aspects, being a multi-package coating composition, wherein
    component (a) is comprised in a first package (A);
    component (b) is comprised in a second package (B);
    compound (c) is comprised in a third package (C) or if Y— is a functional group reactive with the compounds in component (a) compound (c) is present in the second package (B) or if Y— is a functional group reactive with the compounds in component (b) compound (c) is present in the first package (A)
    the compound providing an expansion gas upon thermal decomposition (d) and any of the additives (e) and (f) if present are comprised in any combination in either package (A), (B) or (C) or in any combination of theses packages or are comprised in one or more further packages (D); wherein the packages are mixed immediately prior to application of the coating composition.

14. A method for coating a substrate comprising applying the intumescent coating composition according to any of aspects 1-13 at least partially to a substrate and optionally curing the applied coating composition.

15. The method of aspect 14, wherein the substrate comprises a metal substrate, suitably selected from aluminum and steel substrates or plastic substrate suitably selected from polycarbonate.

16. A substrate coated by the method of any of aspects 14 or 15.

17. An article comprising the substrate of aspect 16.

18. The article of aspect 17 being a battery suitably a lithium ion battery or a battery case.

19. The article of aspect 17 comprising a battery, suitably a lithium ion battery or a battery case, wherein the intumescent coating composition as defined in any of aspects 1-13 is applied to a part of the article adjacent to the battery between the battery and the article.

20. The article of aspect 17, wherein the article is a vehicle comprising a lithium ion battery or a battery case with sets of batteries and a passenger cabin and the intumescent coating composition is applied to at least a part of the floor portion of the vehicle adjacent to the battery between the battery and the vehicle body.

21. Use of the intumescent coating composition of any of aspects 1-13
    to provide fire protection for a battery or a battery case and/or to reduce or prevent thermal runaway of a battery or a battery case when applied to any part of the battery or the battery case; or
    to provide fire protection for an article comprising a battery when applied to a part of the article adjacent to the battery between the battery and the article,
    wherein the battery is suitably a lithium ion battery.

22. Use of aspect 21, wherein the article is a vehicle comprising a lithium ion battery and a passenger cabin and the curable intumescent coating composition is used to protect the passenger cabin of the vehicle from a battery fire.

23. A method to provide fire protection to a battery or to reduce or prevent thermal runaway of a battery by applying the intumescent coating composition of any of aspects 1-13 to any part of the battery to form a coating thereon, wherein the battery is suitably a lithium ion battery.

24. A method to provide fire protection for an article comprising a battery by applying the intumescent coating composition of any of aspects 1-13 to a part of the article adjacent to the battery between the battery and the article to form a coating thereon.

25. The method of aspect 24, wherein the article is a vehicle comprising a lithium ion battery and a passenger cabin and the crosslinked intumescent coating is positioned to protect the passenger cabin of the vehicle from a battery fire.

The following examples are intended to be illustrative of the invention and are not intended to be limiting.

EXAMPLES

Example 1

Following base and hardener components were combined and thoroughly mixed:
Base:

| Component | Parts by weight |
| --- | --- |
| Bisphenol A epoxy resin[1] | 55 |
| 1,4-butanediol diglycidyl ether | 21.5 |
| Amide wax[2] | 1.6 |
| Pentaerythritol | 15.7 |
| Carbon black[3] | 6.2 |

[1]EPON 828 Hexion Specialty Chemicals BV Vondelingenweg 601, 3196 KK Vondelingenplaat, The Netherlands
[2]CRAYVALLAC ULTRA Arkema Inc., Europaweg Zuid 2, 4389 PD Ritthem The Netherlands
[3]LAMP BLACK 101 Evonik Industries, Rellinghauser Straße 1-11, Essen, 45128, Germany

| Component | Parts by weight |
|---|---|
| Polyamide amine[4] | 1.7 |
| Isophorone diamine | 3.1 |
| Tall oil fatty acid[5] | 4.4 |
| Benzyl alcohol | 7.9 |
| Ammonium polyphosphate[6] | 49.5 |
| Melamine | 15.7 |
| N-[3-(Trimethoxysilyl)propyl]ethylenediamine | 17.7 |

[4]ARADUR 140, Huntsman, Dalenstraat 33, 3020 Winksele, Belgium

[5]TALL OIL FATTY ACID Georgia-Pacific Nederland B.V., Teleportboulevard 140, 1043 EJ Amsterdam, The Netherlands

[6]CLARIANT AP 422 Clariant, Industriestraße, 50354 Hürth, Germany

The mixture was spray applied to an aluminum panel (type 5005 H24) with 0.8 mm thickness and allowed to cure at 23° C. for a minimum of seven days. The dry coating thickness of the cured coating was 150 μm.

On the back of the coated sample, a thermocouple was attached at the center point to monitor the temperature through the sample. The center of the coated panel was then positioned at a distance of 4 cm from a propane torch (diameter 3.5 cm, propane) with the crosslinked intumescent coating in the direction to the torch. The temperature of the flame was monitored through a second thermocouple placed close to the base of the flame and found to remain stable between 900-1000° C. The temperature at the back of the coated substrate was measured for a prolonged period of time. The result is shown in FIG. 1.

Example 2

Example 1 was repeated, with the exception that the following base and hardener formulations were used:
Base:

| Component | Parts by weight |
|---|---|
| Bisphenol A epoxy resin[1] | 67.0 |
| 1,4-butanediol diglycidyl ether | 26.2 |
| Amide wax[2] | 0.3 |
| Pentaerythritol | 2.7 |
| Carbon black[3] | 3.8 |

| Component | Parts by weight |
|---|---|
| Polyamide amine[4] | 24.2 |
| Isophorone diamine | 7.4 |
| Polyoxypropylenediamine[7] | 4.9 |
| Tall oil fatty acid[5] | 10.7 |
| Benzyl alcohol | 19.3 |
| Ammonium polyphosphate[6] | 17.1 |
| Melamine | 5.4 |
| N-[3-(Trimethoxysilyl)propyl]ethylenediamine | 11.0 |

[7]JEFFAMINE D-230, Huntsman

Figure 2:
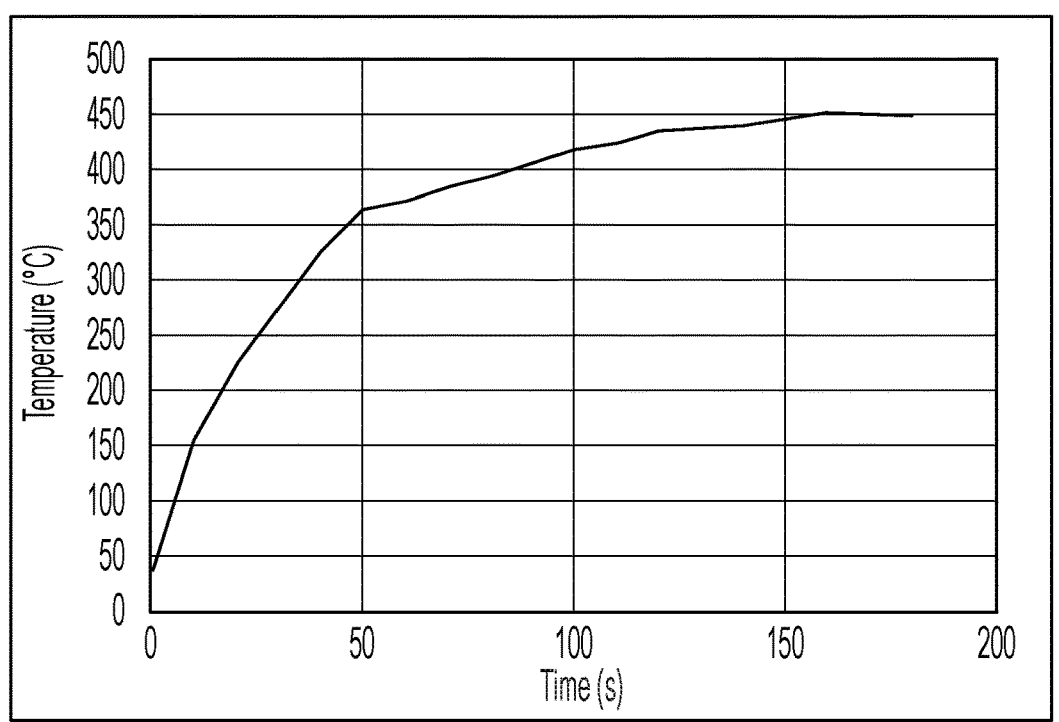
FIG. 2 is a graph showing the thermal transfer of heat through an exemplary intumescent coating of the present invention over time.

The result is shown in FIG. 2.

Example 3

Example 1 was repeated, with the exception that the following base and hardener formulations were used:
Base:

| Component | Parts by weight |
|---|---|
| Bisphenol A epoxy resin[1] | 64.7 |
| Amide wax[2] | 0.6 |
| Pentaerythritol | 8.3 |
| β-(3,4-epoxycyclohexyl)ethyltrimethoxysilane | 22.0 |
| Carbon black[3] | 4.4 |

| Component | Parts by weight |
|---|---|
| O,O'-Bis(2-aminopropyl) polypropylene glycol-block-polyethylene glycol-block-polypropylene glycol[8] | 46.5 |
| Tall oil fatty acid[5] | 4.9 |
| Benzyl alcohol | 9.3 |
| Ammonium polyphosphate[6] | 29.9 |
| Melamine | 9.4 |

[8]JEFFAMINE ED-600, Huntsman

Figure 3:
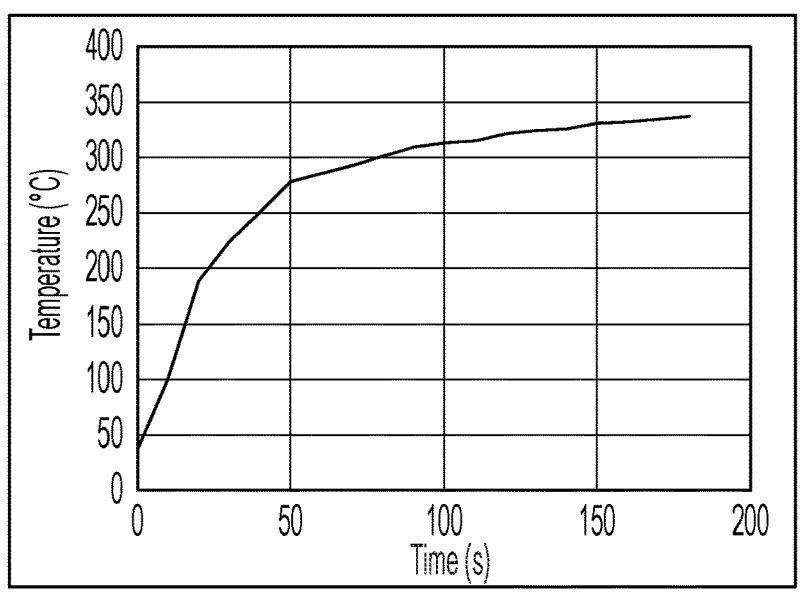
FIG. 3 is a graph showing the thermal transfer of heat through an exemplary intumescent coating of the present invention over time.

The result is shown in FIG. 3.

Example 4

Mix ratio (wt):Base/Hardener=45.7/54.3

Silane content (wt %) in the total composition: 11.62 wt %
Base:

| Component | Parts by weight |
|---|---|
| Bisphenol A epoxy resin[1] | 86.0 |
| Amide wax[2] | 0.6 |
| Pentaerythritol | 9.1 |
| Carbon black[3] | 4.3 |

Hardener:

| Component | Parts by weight |
|---|---|
| O,O'-Bis(2-aminopropyl) polypropylene glycol-block-polyethylene glycol-block-polypropylene glycol | 11.1 |
| Tall oil fatty acid[5] | 8.5 |
| Benzyl alcohol | 14.9 |
| Ammonium polyphosphate[6] | 33.5 |
| Melamine | 10.6 |
| N-[3-(Trimethoxysilyl)propyl]ethylenediamine | 21.4 |

Example 5

Mix ratio (wt):Base/Hardener=44.8/55.2

Silane content (wt %) in the total composition: 9.11 wt %
Base:

| Component | Parts by weight |
|---|---|
| Bisphenol A epoxy resin[1] | 86.0 |
| Amide wax[2] | 0.6 |

-continued

| Component | Parts by weight |
| --- | --- |
| Pentaerythritol | 9.1 |
| Carbon black[3] | 4.3 |

Hardener:

| Component | Parts by weight |
| --- | --- |
| O,O'-Bis(2-aminopropyl) polypropylene glycol-block-polyethylene glycol-block-polypropylene glycol[8] | 18.1 |
| Tall oil fatty acid[5] | 8.3 |
| Benzyl alcohol | 14.5 |
| Ammonium polyphosphate[6] | 32.4 |
| Melamine | 10.2 |
| N-[3-(Trimethoxysilyl)propyl]ethylenediamine | 16.5 |

Example 6

Mix ratio (wt):Base/Hardener=44.1/55.9
Silane content (wt %) in the total composition: 6.82 wt %
Base:

| Component | Parts by weight |
| --- | --- |
| Bisphenol A epoxy resin[1] | 86.0 |
| Amide wax[2] | 0.6 |
| Pentaerythritol | 9.1 |
| Carbon black[3] | 4.3 |

Hardener

| Component | Parts by weight |
| --- | --- |
| O,O'-Bis(2-aminopropyl) polypropylene glycol-block-polyethylene glycol-block-polypropylene glycol[8] | 24.4 |
| Tall oil fatty acid[5] | 8.0 |
| Benzyl alcohol | 14.0 |
| Ammonium polyphosphate[6] | 31.4 |
| Melamine | 9.9 |
| N-[3-(Trimethoxysilyl)propyl]ethylenediamine | 12.2 |

Example 7 (Comparative)

Mix ratio (wt):Base/Hardener=43.2/56.8
Silane content (wt %) in the set: 4.17 wt %
Base:

| Component | Parts by weight |
| --- | --- |
| Bisphenol A epoxy resin | 86.0 |
| Amide wax[2] | 0.6 |
| Pentaerythritol | 9.1 |
| Carbon black | 4.3 |

Hardener:

| Component | Parts by weight |
| --- | --- |
| O,O'-Bis(2-aminopropyl) polypropylene glycol-block-polyethylene glycol-block- | 31.4 |

-continued

| Component | Parts by weight |
| --- | --- |
| polypropylene glycol | |
| Tall oil fatty acid | 7.7 |
| Benzyl alcohol | 13.5 |
| Ammonium polyphosphate | 30.4 |
| Melamine | 9.6 |
| N-[3-(Trimethoxysilyl)propyl]ethylenediamine | 7.4 |

Example 8 (Comparative)

Mix ratio (wt):Base/Hardener=42.5/57.5
Silane content (wt %) in the total compostion: 2.01 wt %

| Component | Parts by weight |
| --- | --- |
| Bisphenol A epoxy resin[1] | 86.0 |
| Amide wax[2] | 0.6 |
| Pentaerythritol | 9.1 |
| Carbon black[3] | 4.3 |

Hardener:

| Component | Parts by weight |
| --- | --- |
| O,O'-Bis(2-aminopropyl) polypropylene glycol-block-polyethylene glycol-block-polypropylene glycol[8] | 37.0 |
| Tall oil fatty acid[5] | 7.5 |
| Benzyl alcohol | 13.2 |
| Ammonium polyphosphate[6] | 29.5 |
| Melamine | 9.3 |
| N-[3-(Trimethoxysilyl)propyl]ethylenediamine | 3.5 |

Example 9 (Comparative)

Mix ratio (wt):Base/Hardener=42.1/57.9
Silane content (wt %) in the set: 0.81 wt %
Base:

| Component | Parts by weight |
| --- | --- |
| Bisphenol A epoxy resin[1] | 86.0 |
| Amide wax[2] | 0.6 |
| Pentaerythritol | 9.1 |
| Carbon black[3] | 4.3 |

Hardener:

| Component | Parts by weight |
| --- | --- |
| O,O'-Bis(2-aminopropyl) polypropylene glycol-block-polyethylene glycol-block-polypropylene glycol[8] | 40.1 |
| Tall oil fatty acid[5] | 7.4 |
| Benzyl alcohol | 12.9 |
| Ammonium polyphosphate[6] | 29.0 |
| Melamine | 9.2 |
| N-[3-(Trimethoxysilyl)propyl]ethylenediamine | 1.4 |

Figure 4:
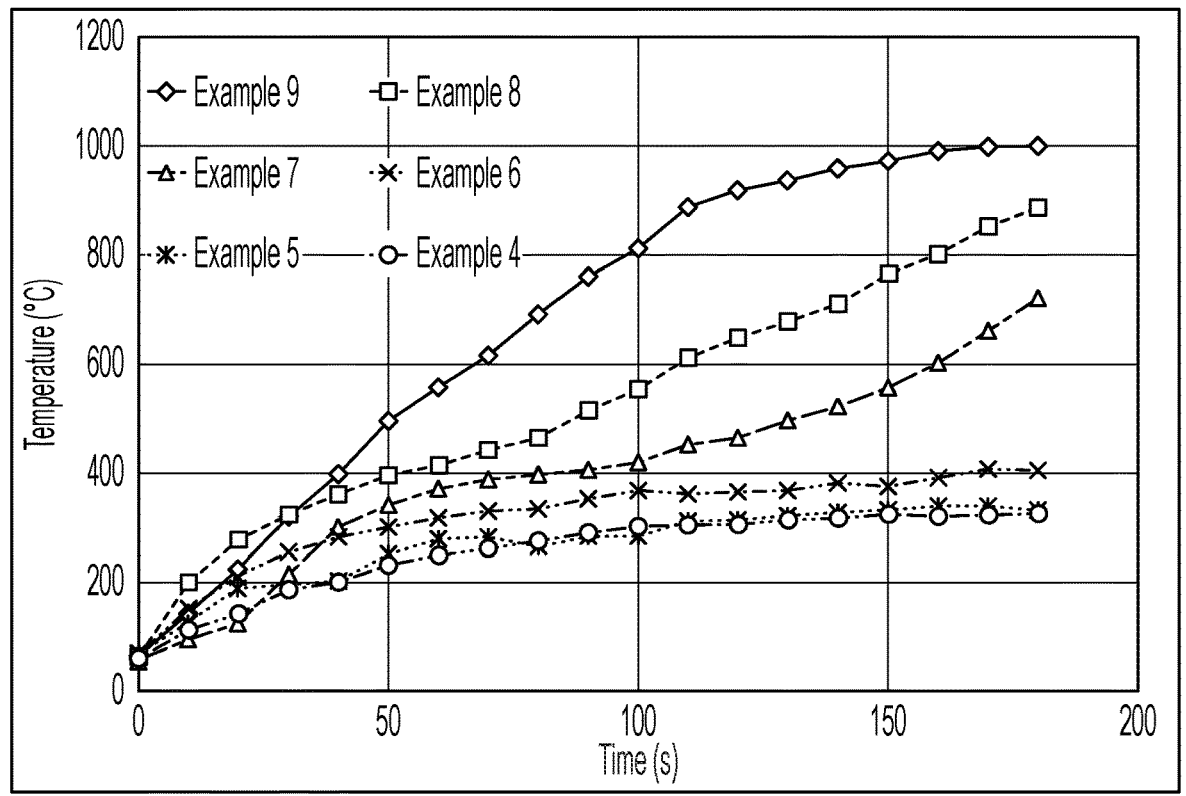
FIG. 4 is a graph showing the thermal transfer of heat through several exemplary intumescent coatings of the present invention over time.

The intumescent coating compositions of examples 4 to 9 were applied to aluminum panels and tested as described for example 1. The results are shown in FIG. 4.

What is claimed is:

1. An intumescent coating composition comprising:

(a) a resin component comprising (a1) a polyepoxy-functional compound and optionally;

(a2) a beta-hydroxy ester of (meth)acrylic acid; and/or (a3) a (meth)acrylate-functional compound different from compound (a2);

(b) a crosslinker component comprising a polyamine-functional compound; a polythiol-functional compound; or combinations thereof;

(c) 5 to 20 wt.-% based on the total weight of the intumescent coating composition of an organo silane compound selected from organo silane compounds of formula (I) or (II) and combinations thereof $$(Y\text{-}L\text{-})_n\text{-}SiX_mR_o \qquad (I),$$

$$(Y\text{-}L)_u\text{-}B\text{—}(K\text{—}SiX_vR_w)_z \qquad (II)$$

wherein:

n and m are integers from 1 to 3 and o is an integer from 0 to 2, wherein n

+m+o is 4;

y is an integer from 1 to 3 and w is an integer from 0 to 2, wherein y+w is 3;

u is an integer of at least 1 and z is an integer of at least 2;

B is a polyvalent organic group, wherein the valency of B is u+z;

L is a divalent organic group or a bond if Y is a vinyl group;

K is a divalent organic group or a bond;

Y is selected from an epoxy group, an amino group, a polyamino group, an amido group, a thiol group, a carboxylic acid group, a hydroxy group, a (meth) acryloxy group, a vinyl group, and combinations thereof;

X is independently selected at each occurrence from chloro, alkoxy, acyloxy and oximino;

R is a hydrocarbyl group; and (d) a compound providing an expansion gas upon thermal decomposition wherein such compound comprises melamine; wherein the compounds as defined for (a) to (d) differ from each other, wherein the intumescent coating composition is liquid at 23° C. and atmospheric pressure and comprises less than 5 wt.-% water based on the total weight of the composition.

2. The coating composition of claim 1, wherein for the organo silane compound of the formula (I) or (II)

L is selected from alkylene and cycloalkylene groups having 1 to 10 carbon atoms and a bond if Y is a vinyl group; and/or I K is selected from alkylene and cycloalkylene groups having 1 to 10 carbon atoms and a bond; and/or X is selected from alkoxy groups having 1 to 4 carbon atoms; and/or R is a $C_1$ to $C_4$ alkyl group; and/or B is a polyvalent alkyl group; and/or n is 1, o is 0 and m is 3; and/or u is 1 and z is 2.

3. The coating composition of claim 1, wherein the organo silane compound is selected from vinyl trialkoxysilane, 3-glycidoxypropyl trialkoxysilane, 3-(meth)acryloxypropyl trialkoxysilane, aminoalkyl trialkoxysilane, aminoalkyl di alkyl monoalkoxysilane, bis-(aminoalkyl) dialkoxysilane, thiolalkyl trialkoxysilane, thiolalkyl alkyl dialkoxysilane, thiolalkyl di alkyl monoalkoxysilane, N-[3-(trimethoxysilyl)

propyl] ethylenediamine, β-(3,4-epoxycyclohexyl) ethyl trimethoxysilane and combinations thereof.

4. The coating composition of claim 1, wherein the polyepoxy-functional compound (a1) comprises diglycidyl ether of bisphenol A, diglygidyl ether of bisphenol F, an epoxy phenol novolac resin, an epoxy cresol novolac resin, epoxy functional acrylic resins, epoxy functional polyester or combinations thereof.

5. The coating composition of claim 1, wherein the beta-hydroxy ester of (meth)acrylic acid (a2) is present and comprises a plurality of beta-hydroxy (meth)acrylic ester groups, resulting from the reaction of a polyepoxide, selected from diglycidyl ether of bisphenol A, diglygidyl ether of bisphenol F, an epoxy phenol novolac resin, an epoxy cresol novolac resin, epoxy functional acrylic resins, epoxy functional polyester or combinations thereof with (meth)acrylic acid, wherein the beta-hydroxy ester of (meth) acrylic acid (a2) comprises the product of the reaction of a polyepoxide with (meth)acrylic acid in an epoxy carboxylic acid equivalent ratio of 1:0.1 to 1:1.015.

6. The coating composition of claim 1, wherein the (meth)acrylate-functional compound (a3) is present and selected from poly (meth)acrylates of 1,4-butanediol, neopentyl glycol, ethylene glycol, 1,2-propanediol, 1,3-propanediol, 2,2,4-trimethyl-1,3-pentanediol, 1,6-hexanediol, 1,4-cyclohexane dimethanol, para-xylene glycol, 1,4-cyclohexane diol, trimethylolethane, trimethylolpropane, pentaerythritol and combinations thereof.

7. The coating composition of claim 1, wherein component (a) comprises 20-100 wt.-% of the polyepoxy-functional compound (a1);

0-75 wt.-% of the beta-hydroxy ester of (meth)acrylic acid (a2); and 0-50 wt.-% of the (meth)acrylate-functional compound (a3) different from compound (a2), wherein the weight percentages are based on the total weight of compounds (a1), (a2) and (a3).

8. The coating composition of claim 1, wherein the polyamine-functional compound comprises an aliphatic polyamine, an aromatic polyamine, poly (amine-amides), and combinations thereof: and/or polythiol-functional compound is selected from polysulfide thiols, polyether thiols, polyester thiols, pentaerythritol based thiols and combinations thereof.

9. The coating composition of claim 1, wherein the equivalent ratio of the combined epoxy groups in (a) to the functional groups in (b) is from 2:1 to 1:2.

10. The coating composition of claim 1, further comprising pigments and/or fillers (e), wherein the total amount of white pigments and/or fillers selected from aluminum oxides, silicon oxide, mica, wollastonite, titanium oxides, clay, talc, and diatomaceous earth compounds is less than 2 wt.-%, based on the total weight of the composition, and the amount of colored pigments, particularly black pigments is at least 0.5 wt.-%, based on the total weight of the composition.

11. The coating composition of claim 1, further comprising additives (f) selected from a phosphorous source, a boron source, a zinc source, an acid source, a carbon source, rheology additives, organic solvents, pigments, foam stabilizers, adhesion promoters, corrosion inhibitors, UV stabilizers and combinations thereof.

12. The coating composition of claim 1, being a multi-package coating composition, wherein component (a) is comprised in a first package (A);

component (b) is comprised in a second package (B);

compound (c) is comprised in a third package (C) or is present in the second package (B); and the compound providing an expansion gas upon thermal decomposition (d) comprised in any combination in either package (A), (B) or (C) or in any combination of these packages or are comprised in one or more further packages (D); wherein the packages are mixed immediately prior to application of the coating composition.

13. A method for coating a substrate comprising applying the intumescent coating composition of claim 1 to at least a portion of a substrate and optionally curing the applied coating composition.

14. The method of claim 13, wherein the substrate comprises a metal substrate or plastic substrate.

15. A substrate coated by the method of claim 13.

16. An article comprising the substrate of claim 15.

17. The article of claim 16 being a battery or a battery case.

18. The article of claim 16 comprising a battery, wherein the intumescent coating composition is applied to a part of the article adjacent to the battery between the battery and the article.

19. The article of claim 16, wherein the article is a vehicle comprising a lithium ion battery or a battery case with sets of batteries and a passenger cabin and the intumescent coating composition is applied to at least a part of the floor portion of the vehicle adjacent to the battery between the battery and the vehicle body.

20. A method to provide fire protection to a battery or to reduce or prevent thermal runaway of a battery by applying the intumescent coating composition of claim 1 to any part of the battery to form a coating thereon.

21. A method to provide fire protection for an article comprising a battery by applying the intumescent coating composition of claim 1 to a part of the article adjacent to the battery between the battery and the article to form a coating thereon.

22. The method of claim 21, wherein the article is a vehicle comprising a lithium ion battery and a passenger cabin and the crosslinked intumescent coating is positioned to protect the passenger cabin of the vehicle from a battery fire.

23. The intumescent coating composition of claim 1, wherein the organo silane compound comprises 10 to 18 wt.-% of the composition, based on the total weight of the intumescent coating composition.

24. An intumescent coating composition comprising:

(a) a resin component comprising (a1) a polyepoxy-functional compound and optionally;

(a2) a beta-hydroxy ester of (meth)acrylic acid; and/or (a3) a (meth)acrylate-functional compound different from compound (a2);

(b) a crosslinker component comprising an aliphatic polyamine, an aromatic polyamine, a polyamine amide, a polyetheramine, a polysiloxane amine, a polysulfide amine, an adduct of a polyamine, a polythiol compound or combinations thereof; and when the crosslinker component comprises an aromatic polyamine, the aromatic polyamine does not comprise melamine;

(c) 5 to 20 wt.-% based on the total weight of the intumescent coating composition of an organo silane compound selected from organo silane compounds of formula (I) or (II) and combinations thereof $$(\text{Y-L-})_n\text{-SiX}_m\text{R}_o \tag{I},$$

$$(\text{Y-L})_u\text{-B}\text{---}(\text{K---SiX}_y\text{R}_w)_z \tag{II}$$

wherein:

n and m are integers from 1 to 3 and o is an integer from 0 to 2, wherein n+m+o is 4;

y is an integer from 1 to 3 and w is an integer from 0 to 2, wherein y+w is 3;

u is an integer of at least 1 and z is an integer of at least 2;

B is a polyvalent organic group, wherein the valency of B is u+z;

L is a divalent organic group or a bond if Y is a vinyl group;

K is a divalent organic group or a bond;

Y is selected from an epoxy groups, an amino group, a polyamino group, an amido group, a thiol group, a carboxylic acid group, a hydroxyl group, a (meth) acryloxy group, a vinyl group, and combinations thereof;

X is independently selected at each occurrence from chloro, alkoxy, acyloxy and oximino;

R is a hydrocarbyl group; and (d) a compound providing an expansion gas upon thermal decomposition; wherein the compounds as defined for (a) to (d) differ from each other, wherein the intumescent coating composition is liquid at 23° C. and atmospheric pressure and comprises less than 5 wt.-% water based on the total weight of the composition.

25. The intumescent coating composition of claim 24, wherein the crosslinker component comprises polyamide amine, isophorone diamine, polyoxypropylenediamine, O,O'-Bis (2-aminopropylene glycol-block-polyethylene glycol-block-propylene glycol, 3,3-amino-bis-propylamine, triethylene tetraamine, diethylene triamine, tetraethylene pentamine, m-xylylenediamine, 1,3-bis(aminoethyl) cyclohexane, bis(4-aminocyclohexyl) methane, N-aminoethyl piperazine, 4,4'diamino diphenyl methane, 4,4'-diamino-3,3'-diethyl diphenyl methane and diamino diphenylsulphone, the reaction product of a polyamine and an aliphatic fatty acid, and combinations thereof and the compound providing an expansion gas comprises melamine, salts of phosphoric acid, guanidine, methylolated melamine, hexamethoxymethyl melamine, urea, dimethylurea, melamine pyrophosphate, dicyandiamide, guanylurea phosphate, glycine, and combinations thereof.

26. An intumescent coating composition comprising:

(a) a resin component comprising (a1) a polyepoxy-functional compound and optionally;

(a2) a beta-hydroxy ester of (meth)acrylic acid; and/or (a3) a (meth)acrylate-functional compound different from compound (a2);

(b) a crosslinker component, (c) 5 to 20 wt.-% based on the total weight of the intumescent coating composition of an organo silane compound selected from organo silane compounds of formula (I) or (II) and combinations thereof $$(\text{Y-L-})_n\text{-SiX}_m\text{R}_o \tag{I},$$

$$(\text{Y-L})_u\text{-B}\text{---}(\text{K---SiX}_y\text{R}_w)_z \tag{II}$$

wherein:

n and m are integers from 1 to 3 and o is an integer from 0 to 2, wherein n+m+o is 4;

y is an integer from 1 to 3 and w is an integer from 0 to 2, wherein y+w is 3;

u is an integer of at least 1 and z is an integer of at least 2;

B is a polyvalent organic group, wherein the valency of B is u+z;

L is a divalent organic group or a bond if Y is a vinyl group;

K is a divalent organic group or a bond;

Y is selected from an epoxy groups, an amino group, a polyamino group, an amido group, a thiol group, a carboxylic acid group, a hydroxyl group, a (meth) acryloxy group, a vinyl group, and combinations thereof;

X is independently selected at each occurrence from chloro, alkoxy, acyloxy and oximino;

R is a hydrocarbyl group; and (d) a compound providing an expansion gas upon thermal decomposition; wherein the compounds as defined for (a) to (d) differ from each other; wherein melamine, if present in the composition, comprises component (b) or component (d), wherein the intumescent coating composition is liquid at 23° C. and atmospheric pressure and comprises less than 5 wt.-% water based on the total weight of the composition.

27. The intumescent coating composition of claim 26, wherein the crosslinker component comprises polyamide amine, isophorone diamine, polyoxypropylenediamine, O,O'-Bis (2-aminopropylene glycol-block-polyethylene glycol-block-propylene glycol, 3,3-amino-bis-propylamine, triethylene tetraamine, diethylene triamine, tetraethylene pentamine, m-xylylenediamine, 1,3-bis(aminoethyl) cyclohexane, bis(4-aminocyclohexyl) methane, N-aminoethyl piperazine, 4,4'diamino diphenyl methane, 4,4'-diamino-3,3'-diethyl diphenyl methane and diamino diphenylsulphone, the reaction product of a polyamine and an aliphatic fatty acid, and combinations thereof and the compound providing an expansion gas comprises melamine, salts of phosphoric acid, guanidine, methylolated melamine, hexamethoxymethyl melamine, urea, dimethylurea, melamine pyrophosphate, dicyandiamide, guanylurea phosphate, glycine, and combinations thereof.

* * * * *